United States Patent
Diao et al.

(10) Patent No.: US 10,444,500 B2
(45) Date of Patent: Oct. 15, 2019

(54) PROJECTION SCREEN OF HEAD-UP DISPLAY

(71) Applicant: Sichuan Longhua Film Co., Ltd, Mianyang, Sichuan (CN)

(72) Inventors: Rui-Min Diao, Mianyang (CN); Yao-Chang Wang, Zhubei (TW)

(73) Assignee: SICHUAN LONGHUA FILM CO., LTD, Mianyang (CN)

( * ) Notice: Subject to any disclaimer, the term of this patent is extended or adjusted under 35 U.S.C. 154(b) by 0 days.

(21) Appl. No.: 16/102,326

(22) Filed: Aug. 13, 2018

(65) Prior Publication Data

US 2019/0056650 A1    Feb. 21, 2019

(30) Foreign Application Priority Data

Aug. 18, 2017   (CN) .......................... 2017 1 0710408

(51) Int. Cl.
| | | |
|---|---|---|
| *G02B 27/01* | (2006.01) | |
| *G03B 21/56* | (2006.01) | |
| *G02B 26/02* | (2006.01) | |

(52) U.S. Cl.
CPC ....... *G02B 27/0101* (2013.01); *G03B 21/567* (2013.01); *B60K 2370/334* (2019.05); *G02B 26/02* (2013.01); *G02B 2027/0118* (2013.01)

(58) Field of Classification Search
CPC ............................ G03B 21/62; G02B 27/0101
See application file for complete search history.

(56) References Cited

U.S. PATENT DOCUMENTS

| | | | | |
|---|---|---|---|---|
| 7,609,442 | B2* | 10/2009 | Fricke | G03B 21/56 |
| | | | | 345/207 |
| 7,884,992 | B1* | 2/2011 | Wang | G02B 5/23 |
| | | | | 349/13 |
| 9,310,541 | B2* | 4/2016 | Gross | G02B 5/23 |
| 9,674,413 | B1* | 6/2017 | Tiana | H04N 5/2254 |
| 2001/0028501 | A1* | 10/2001 | Hunter | G02F 1/135 |
| | | | | 359/449 |
| 2009/0091718 | A1* | 4/2009 | Obi | G03B 21/56 |
| | | | | 355/30 |
| 2011/0155975 | A1* | 6/2011 | Chakravarti | C08J 5/18 |
| | | | | 252/589 |
| 2012/0242678 | A1* | 9/2012 | Border | G02B 27/0093 |
| | | | | 345/589 |
| 2016/0116979 | A1* | 4/2016 | Border | G06F 3/013 |
| | | | | 345/156 |
| 2017/0160621 | A1* | 6/2017 | Yamashita | G03B 21/62 |
| 2018/0348522 | A1* | 12/2018 | Young | G02B 27/0172 |

FOREIGN PATENT DOCUMENTS

WO    WO-2016147486 A1 *   9/2016   ............. B60K 35/00

* cited by examiner

*Primary Examiner* — Christopher E Mahoney (57) ABSTRACT

A projection screen of a head-up display has a projection surface and a back surface opposite to the projection surface. The projection surface is used for receiving an image beam projected by an image projection component and reflecting part of the image beam. The projection screen includes a photochromic layer disposed on the transmission path of the image beam. When an ambient light irradiates the back surface of the projection screen, the transmittance of the photochromic layer decreases as the intensity of the ambient light increases.

7 Claims, 5 Drawing Sheets

PROJECTION SCREEN OF HEAD-UP DISPLAY

FIELD OF THE INVENTION

The present invention relates to a projection screen of a head-up display, and more particularly to a projection screen of a head-up display in which the transmittance of the projection screen can be reduced as the intensity of ambient light increases.

BACKGROUND OF THE INVENTION

With the increasing demand for automotive electronic components year by year, a variety of driving information display devices have been developed successively. In general, driving information display devices are usually disposed on a dashboard, but driving accidents are likely to be caused while a driver looks down at the information on the dashboard. Therefore, head-up displays that can display driving information on a windshield have been widely used. Since the head-up display can reduce the number of times and the time that the driver's line of sight leaves the front field of view, driving safety can be further protected.

In general, the head-up display projects an image beam to a projection screen with an image projection component for display. The projection screen may be a windshield of a vehicle, a reflective film affixed on a windshield, or an independent reflective plate, etc. However, in the daytime or when an ambient light source is stronger, the contrast of the images displayed on the projection screens is caused to be too low, resulting in difficulties in reading.

SUMMARY OF THE INVENTION

The present invention provides a projection screen of a head-up display, in which the transmittance decreases as the intensity of ambient light increases.

The present invention provides a projection screen of a head-up display. The projection screen has a projection surface and a back surface opposite to the projection surface. An image projection component projects an image beam on the projection surface, and the projection surface reflects part of the image beam.

The projection surface is used for receiving an image beam projected by an image projection component and reflecting part of the image beam. The projection screen includes a photochromic layer disposed on the transmission path of the image beam. When an ambient light irradiates the back surface of the projection screen, the transmittance of the photochromic layer decreases as the intensity of the ambient light increases.

In one of the embodiments of the present invention, the projection screen further includes a transparent substrate. The transparent substrate has a first plane. The photochromic layer is formed on the first plane and covers part of the first plane.

In one of the embodiments of the present invention, the photochromic layer has the back surface. The ambient light directly irradiates the photochromic layer.

In one of the embodiments of the present invention, the projection screen further includes a transflective layer. The transparent substrate further has a second plane opposite to the first plane. The transflective layer is formed on the second plane and covers part of the second plane. The transflective layer further has the projection surface. The image beam from the image projection component is directly incident to the transflective layer from the projection surface.

In one of the embodiments of the present invention, the photochromic layer has the projection surface. The image beam from the image projection component is incident to the photochromic layer from the projection surface.

In one of the embodiments of the present invention, the projection screen further includes a transflective layer. The transflective layer is formed on a plane of the photochromic layer. The transflective layer has the projection surface. The image beam from the image projection component is incident to the transflective layer from the projection surface.

In one of the embodiments of the present invention, the transparent substrate has the back surface. The projection screen further includes a transflective layer. The transflective layer is formed on a plane of the photochromic layer. The transflective layer has the projection surface. The image beam from the image projection component is incident to the transflective layer from the projection surface. The ambient light directly irradiates the transparent substrate.

In one of the embodiments of the present invention, the photochromic layer is a film, a sheet, or a coating.

In one of the embodiments of the present invention, the photochromic layer includes a color-changing material. The color-changing material is selected from the group consisting of silver bromide, silver chloride, silver iodide, and organic photochromic molecules.

In one of the embodiments of the present invention, the ambient light contains ultraviolet light, and the ultraviolet light causes the transmittance of the photochromic layer to change.

Through the disposition of the photochromic layer at the projection screen of the head-up display of the present invention, the transmittance of the projection screen can be reduced as the intensity of the ambient light increases. The contrast of display information can be effectively improved. In the daytime or when an ambient light source is stronger, the display information displayed on the projection screen can still have sufficient contrast so that a user can still clearly see the image on the projection screen.

The above description is only an overview of the technical solutions of the present invention. In order to more clearly understand the technical means of the present invention, which can be implemented in accordance with the contents of the specification, and in order that the above-mentioned and other objectives, features and advantages of the present invention can be more clearly understood, the embodiments are described below in detail with reference to the accompanying drawings.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF EMBODIMENTS

The aforementioned and other technical contents, features and effectiveness of the present invention are clearly presented in the following detailed description of an embodiment in conjunction with the reference drawings. In the following detailed description of the embodiments, reference is made to the accompanying drawings which form a part hereof, and in which is shown by way of illustration specific embodiments in which the invention may be practiced. In this regard, directional terminology, such as "upper", "lower", "left", "right", "front", or "back", etc., is used with reference to the orientation of the Figure(s) being described. The components of the invention can be positioned in a number of different orientations. As such, the directional terminology is used for purposes of illustration and is in no way limiting.

Figure 1A:
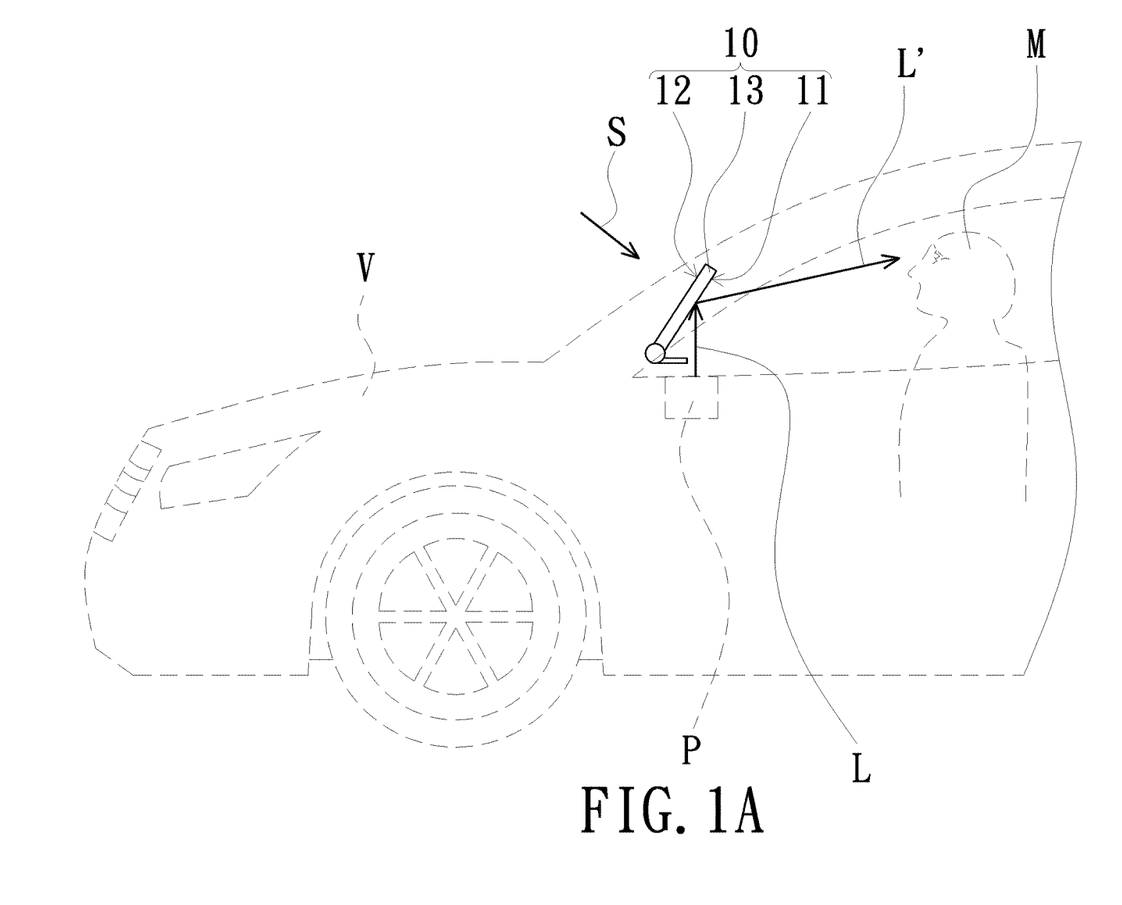
FIG. 1A is a schematic application diagram of a projection screen of a head-up display in accordance with an embodiment of the present invention.

FIG. 1A is a schematic application diagram of a projection screen of a head-up display in accordance with an embodiment of the present invention. Please refer to FIG. 1A. In the present embodiment, the projection screen 10 of the head-up display is installed on a vehicle V as an example, but the present invention is not limited thereto. In other embodiments of the present invention, a projection screen of a head-up display may be installed, for example, on a tool of transportation such as a motorcycle, an aircraft or a vessel, etc., or may be installed, for example, on a helmet, and the present invention is not limited thereto.

Figure 1B:
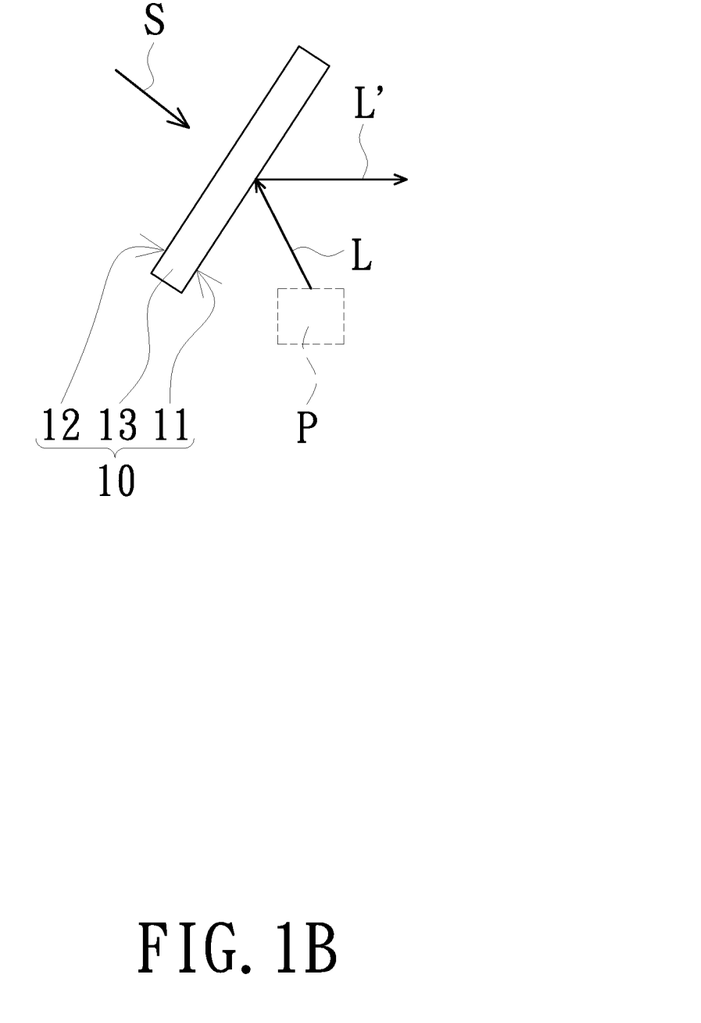
FIG. 1B is a schematic diagram of a projection screen of a head-up display in accordance with an embodiment of the present invention.

Please refer to FIG. 1A and FIG. 1B. FIG. 1B is an enlarged schematic diagram of the projection screen 10 and an image projection component P in FIG. 1A, for convenience of description of the operation of the projection screen of the head-up display in the present embodiment. The projection screen 10 of the head-up display includes a photochromic layer 13. The projection screen 10 further has a projection surface 11 and a back surface 12 opposite to the projection surface 11. In the present embodiment, the photochromic layer 13 may be a sheet or a film. The projection surface 11 of the projection screen 10 is a surface of the photochromic layer 13 close to the image projection component P. The back surface 12 is a surface of the photochromic layer 13 away from the image projection component P.

The image projection component P may be, for example, a projection device, installed on the vehicle V and located below the projection screen 10, but the present invention is not limited thereto. The image projection component P can project an image beam L on the projection surface 11. The photochromic layer 13 is disposed on the transmission path of the image beam L. The projection surface 11 of the projection screen 10 is used for receiving the image beam L projected by the image projection component P and reflecting part of the image beam L as a reflected image beam L', which is transmitted to a user M.

The image beam L projected by the image projection component P may include, for example, driving information such as the speed of the vehicle, the voltage of the battery, the tire pressure, the amount of fuel, the fault (abnormal) condition, and/or the global positioning, etc. The reflected image beam L' reflected by the projection surface 11 can be provided to the user M for reading the driving data. Since the projection screen 10 can be disposed in the vehicle V and located within the field of view where the user M observes the road ahead, the number of times and the time that the sight of the user M leaves the front field of view can be reduced, so as to facilitate to keep the driving user M safe.

In the present embodiment, the photochromic layer 13 includes a color-changing material. The color-changing material is, for example, selected from the group consisting of silver bromide, silver chloride, silver iodide and organic photochromic molecules, but the present invention is not limited thereto. The color-changing material of the photochromic layer 13 changes its color under the irradiation of light. The stronger the intensity of the irradiation light is, the darker the color of the color-changing material is. The photochromic layer 13 further includes light-transmissive materials such as glass or light-transmissive plastics, etc. The color-changing material is evenly distributed in the light-transmissive material.

In the present embodiment, the photochromic layer 13 is mostly made of glass or light-transmissive plastics. Therefore, the projection surface 11 of the photochromic layer 13 close to the image projection component P can have a certain reflectivity, so as to reflect part of the image beam L to the user M. The photochromic layer 13 can also have a certain transmittance for the user M to observe the road ahead. When the photochromic layer 13 is irradiated with light, the color-changing material changes its color, thereby causing the transmittance of the photochromic layer 13 to decrease as the intensity of the irradiation light increases.

When an ambient light S irradiates the back surface 12 of the projection screen 10, the transmittance of the photochromic layer 13 decreases as the intensity of the ambient light S increases, so that the ambient light S passing through the projection screen 10 is reduced. Meanwhile, the intensity of the reflected image beam L' reflected by the projection surface 11 of the projection screen 10 is not changed. Therefore, the contrast of the display image of the projection screen 10 can be improved, thereby solving the problem of difficult reading due to the low contrast of the displayed image on the projection screen of the head-up display in the daytime or when the ambient light source is stronger. At night or when the ambient light source is weaker, the intensity of the ambient light S irradiating the photochromic layer 13 is lower. Thus, the photochromic layer 13 still has a higher transmittance allowing the user M to observe the road ahead.

The ambient light S may be, for example, sunlight, but the present invention is not limited thereto. The transmittance of the photochromic layer 13 is changed, for example, by irradiation of light having a wavelength between 200 nm and 500 nm, but the present invention is not limited thereto. In addition, in an embodiment of the present invention, the ambient light S contains ultraviolet light, and the ultraviolet light causes the transmittance of the photochromic layer 13 to change. Therefore, in the daytime with stronger sunlight, under irradiation of the sunlight containing ultraviolet light, the transmittance of the photochromic layer 13 decreases as the intensity of the ambient light S increases, thereby solving the problem that the contrast of the display image on the projection screen of the head-up display is too low in the daytime.

In addition, in other embodiments of the present invention, the transmittance of the photochromic layer 13 is changed by irradiation of light other than ultraviolet light.

Figure 2:
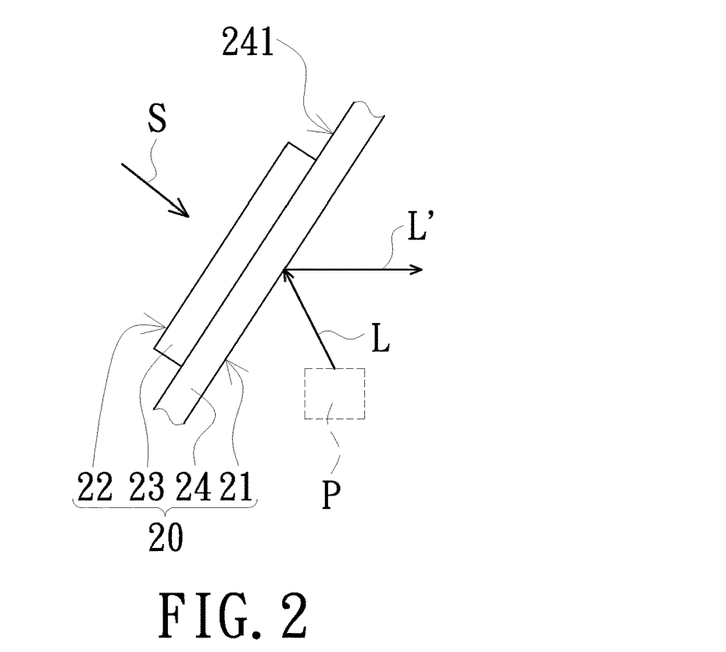
FIG. 2 is a schematic diagram of a projection screen of a head-up display in accordance with another embodiment of the present invention.

FIG. 2 is a schematic diagram of a projection screen of a head-up display in accordance with another embodiment of the present invention. Please refer to FIG. 2. The projection screen 20 of the head-up display of the present embodiment and the projection screen 10 of the head-up display of the embodiment illustrated in FIG. 1A and FIG. 1B have similar structures and the same function and efficacy. The difference between the present embodiment and the embodiment illustrated in FIG. 1A and FIG. 1B is that the projection screen 20 further includes a transparent substrate 24. The transparent substrate 24 has a first plane 241. The photochromic layer 23 is formed on the first plane 241 and covers part of the first plane 241. The photochromic layer 23 is a film, a sheet or a coating. The projection surface 21 of the projection screen 20 is a plane of the transparent substrate 24 opposite to the first plane 241. The back surface 22 is a surface of the photochromic layer 23 away from the image projection component P. In addition, the photochromic layer 23 of the present embodiment may be the same as the photochromic layer 13 of the aforementioned embodiment. The transparent substrate 24 may be, for example, a windshield of a vehicle or goggles of a helmet, etc., but the present invention is not limited thereto.

The image projection component P can project an image beam L. The projection surface 21 of the projection screen 20 is used for receiving the image beam L projected by the image projection component P and reflecting part of the image beam L as a reflected image beam L' for viewing by the user. When the ambient light S irradiates the back surface 22 of the projection screen 20, the transmittance of the photochromic layer 23 decreases as the intensity of the ambient light S increases, so that the ambient light S passing through the projection screen 20 is reduced. Therefore, the contrast of the image displayed on the projection screen 20 can be improved. As such, even if the intensity of the ambient light S (such as sunlight) is too high, the user can still clearly see the image from the projection screen 20, so as to know the driving information (such as the speed of the vehicle and/or the voltage of the battery) immediately.

Figure 3:
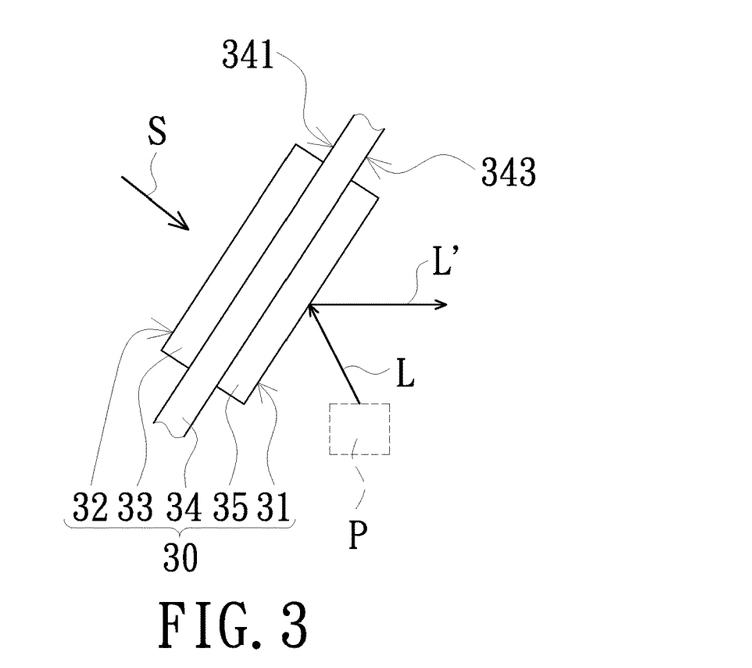
FIG. 3 is a schematic diagram of a projection screen of a head-up display in accordance with yet another embodiment of the present invention.

FIG. 3 is a schematic diagram of a projection screen of a head-up display in accordance with yet another embodiment of the present invention. Please refer to FIG. 3. The projection screen 30 of the head-up display of the present embodiment and the projection screen 10 of the head-up display of the embodiment illustrated in FIG. 1A and FIG. 1B have similar structures and the same function and efficacy. The difference between the present embodiment and the embodiment illustrated in FIG. 1A and FIG. 1B is that the projection screen 30 further includes a transparent substrate 34 and a transflective layer 35. The transparent substrate 34 has a first plane 341 and a second plane 343 opposite to the first plane 341. The transflective layer 35 is formed on the second plane 343 and covers part of the second plane 343. The transflective layer 35 has the projection surface 31. The image beam L projected by the image projection component P is incident to the transflective layer 35 from the projection surface 31. The transflective layer 35 is a light-transmissive material having a certain reflectivity and a certain transmittance. The transflective layer 35 may be, for example, a film, a sheet or a coating, etc., but the present invention is not limited thereto. The photochromic layer 33 is formed on the first plane 341 of the transparent substrate 34 and covers part of the first plane 341. The photochromic layer 33 is a film, a sheet or a coating. The back surface 32 of the projection screen 30 is a surface of the photochromic layer 33 away from the image projection component P. In addition, the photochromic layer 33 of the present embodiment may be the same as the photochromic layer 13 of the aforementioned embodiment. The transparent substrate 34 may be, for example, a windshield of a vehicle or goggles of a helmet, etc., but the present invention is not limited thereto.

The image projection component P can project an image beam L on the projection surface 31. The projection surface 31 of the transflective layer 35 can receive the image beam L projected by the image projection component P and reflect part of the image beam L as a reflected image beam L' for viewing by the user. When the ambient light S irradiates the back surface 32 of the projection screen 30, the transmittance of the photochromic layer 33 decreases as the intensity of the ambient light S increases, so that the ambient light S passing through the projection screen 30 is reduced. Therefore, the contrast of the display image of the projection screen 30 can be improved. Compared with the embodiment shown in FIG. 2, the transflective layer 35 of the present embodiment can have better reflectivity than the transparent substrate 34. Therefore, the projection screen 30 can provide better image quality for the user to read.

Figure 4:
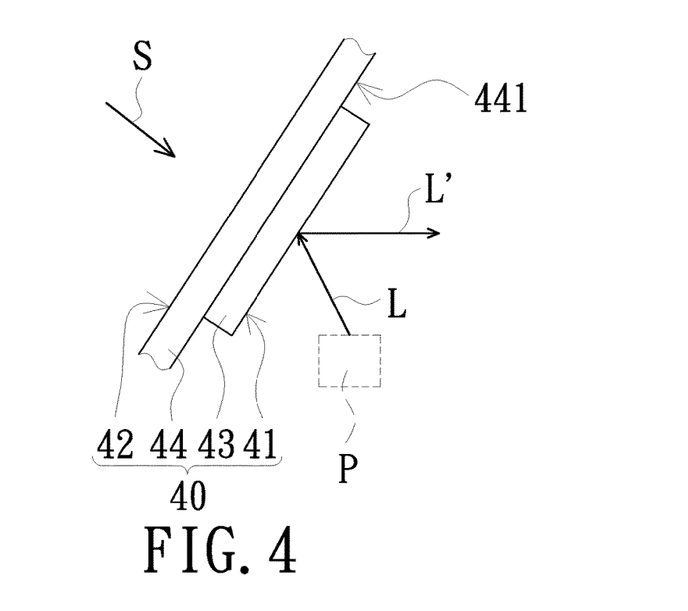
FIG. 4 is a schematic diagram of a projection screen of a head-up display in accordance with yet another embodiment of the present invention.

FIG. 4 is a schematic diagram of a projection screen of a head-up display in accordance with yet another embodiment of the present invention. Please refer to FIG. 4. The projection screen 40 of the head-up display of the present embodiment and the projection screen 10 of the head-up display of the embodiment illustrated in FIG. 1A and FIG. 1B have similar structures and the same function and efficacy. The difference between the present embodiment and the embodiment illustrated in FIG. 1A and FIG. 1B is that the projection screen 40 further includes a transparent substrate 44. The transparent substrate 44 has a first plane 441. The photochromic layer 43 is formed on the first plane 441 and covers part of the first plane 441. The photochromic layer 43 is a film, a sheet or a coating. The photochromic layer 43 has the projection surface 41. The back surface 42 of the projection screen 40 is a surface of the transparent substrate 44 opposite to the first plane 441. The image beam L projected by the image projection component P is incident to the photochromic layer 43 from the projection surface 41. The photochromic layer 43 of the present embodiment may be the same as the photochromic layer 13 of the aforementioned embodiment. The transparent substrate 44 may be, for example, a windshield of a vehicle or goggles of a helmet, etc., and the present invention is not limited thereto.

The image projection component P can project an image beam L on the projection surface 41. The projection surface 41 of the projection screen 40 is used for receiving the image beam L projected by the image projection component P and reflecting part of the image beam L as a reflected image beam L' for viewing by the user. When the ambient light S irradiates the back surface 42 of the projection screen 40, part of the ambient light S passes through the transparent substrate 44 and irradiates the photochromic layer 43. The transmittance of the photochromic layer 43 decreases as the intensity of the ambient light S increases, so that the ambient light S passing through the projection screen 40 is reduced. Therefore, the contrast of the display image of the projection screen 40 can be improved.

Figure 5:
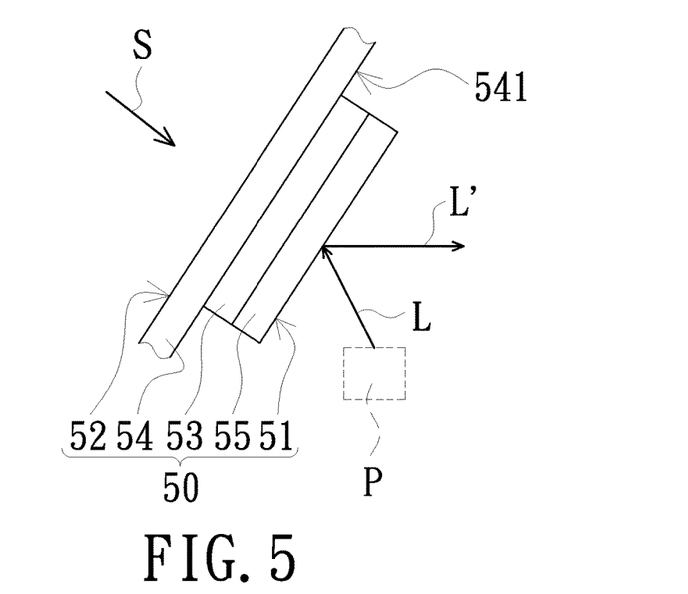
FIG. 5 is a schematic diagram of a projection screen of a head-up display in accordance with yet another embodiment of the present invention.

FIG. 5 is a schematic diagram of a projection screen of a head-up display in accordance with yet another embodiment of the present invention. Please refer to FIG. 5. The projection screen 50 of the head-up display of the present embodiment and the projection screen 10 of the head-up display of the embodiment illustrated in FIG. 1A and FIG. 1B have similar structures and the same function and efficacy. The difference between the present embodiment and the embodiment illustrated in FIG. 1A and FIG. 1B is that the projection screen 50 further includes a transparent substrate 54 and a transflective layer 55. The transparent substrate 54 has a first plane 541. The photochromic layer 53 is formed on the first plane 541 and covers part of the first plane 541. The photochromic layer 53 is a film, a sheet or a coating. The transflective layer 55 is formed on a plane 531 of the photochromic layer 53. The plane 531 is a plane of the photochromic layer 53 opposite to the first plane 541. The back surface 52 of the projection screen 50 is a plane of the transparent substrate 54 opposite to the first plane 541. The transflective layer 55 has the projection surface 51. The image beam L projected by the image projection component P is incident to the transflective layer 55 from the projection surface 51. The transflective layer 55 is a light-transmissive material having a certain reflectivity and a certain transmittance. The transflective layer 55 may be, for example, a film, a sheet or a coating, etc., and the present invention is not limited thereto. The photochromic layer 53 of the present embodiment may be the same as the photochromic layer 13 of the aforementioned embodiment. The transparent substrate 54 may be, for example, a windshield of a vehicle or goggles of a helmet, etc., and the present invention is not limited thereto.

The image projection component P can project an image beam L on the projection surface 51. The projection surface 51 of the projection screen 50 receives the image beam L projected by the image projection component P and reflects part of the image beam L as a reflected image beam L' for viewing by the user. When the ambient light S irradiates the back surface 52 of the projection screen 50, part of the ambient light S passes through the transparent substrate 54 and irradiates the photochromic layer 53. The transmittance of the photochromic layer 53 decreases as the intensity of the ambient light S increases, so that the ambient light S passing through the projection screen 50 is reduced. Therefore, the contrast of the display image of the projection screen 50 can be improved. Compared with the embodiment shown in FIG. 4, the transflective layer 55 of the present embodiment may have better reflectivity than the photochromic layer 53. Therefore, the projection screen 50 can provide better image quality for the user to read.

Figure 6:
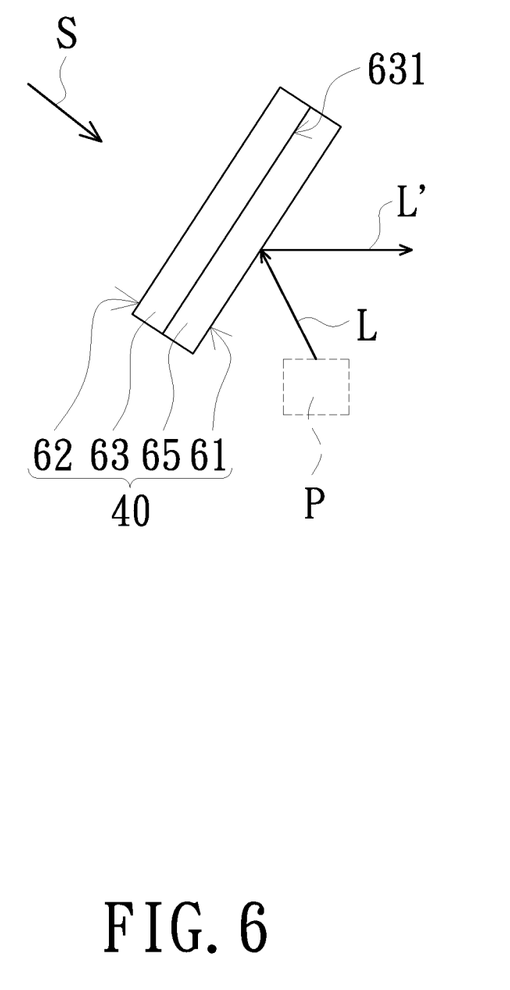
FIG. 6 is a schematic diagram of a projection screen of a head-up display in accordance with yet another embodiment of the present invention.

FIG. 6 is a schematic diagram of a projection screen of a head-up display in accordance with yet another embodiment of the present invention. Please refer to FIG. 6. The projection screen 60 of the head-up display of the present embodiment and the projection screen 10 of the head-up display of the embodiment illustrated in FIG. 1A and FIG. 1B have similar structures and the same function and efficacy. The difference between the present embodiment and the embodiment illustrated in FIG. 1A and FIG. 1B is that the projection screen 60 further includes a transflective layer 65. The transflective layer 65 is a light-transmissive material having a certain reflectivity and a certain transmittance. The transflective layer 65 is a film, a sheet or a coating. The photochromic layer 63 is a film, a sheet or a coating. At least one of the transflective layer 65 and the photochromic layer 63 is not a coating. The transflective layer 65 is formed on a plane 631 of the photochromic layer 63. The back surface 62 of the projection screen 60 is a plane of the photochromic layer 63 opposite to the plane 631. The transflective layer 65 has the projection surface 61. The image beam L projected by the image projection component P is incident to the transflective layer 65 from the projection surface 61. The image beam L from the image projection component P is incident to the transflective layer 65 from the projection surface 61. The photochromic layer 63 of the present embodiment may be the same as the photochromic layer 13 of the aforementioned embodiment.

The image projection component P projects an image beam L. The projection surface 61 of the projection screen 60 is used for receiving the image beam L projected by the image projection component P and reflecting part of the image beam L as a reflected image beam L' for viewing by the user. When the ambient light S irradiates the back surface 62 of the projection screen 60, the transmittance of the photochromic layer 63 decreases as the intensity of the ambient light S increases, so that the ambient light S passing through the projection screen 60 is reduced. Therefore, the contrast of the display image of the projection screen 60 can be improved.

In summary, through the disposition of the photochromic layer at the projection screen of the head-up display disclosed in the above embodiments, the transmittance of the projection screen can be reduced as the intensity of the ambient light increases. The contrast of display information can be effectively improved. In the daytime or when the ambient light source is stronger, the display information displayed on the projection screen still has sufficient contrast so that a user can still clearly see the image on the screen.

While the invention has been described in terms of what is presently considered to be the most practical and embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A projection screen of a head-up display, comprising:
   a photochromic layer, having a projection surface and a back surface opposite to the projection surface,
   wherein an image projection component projects an image beam on the projection surface so that the photochromic layer is disposed on a transmission path of the image beam that is incident to the photochromic layer from the projection surface, wherein the projection surface reflects part of the image beam,
   wherein a transmittance of the photochromic layer decreases as the intensity of an ambient light increases when the ambient light irradiates the back surface of the photochromic layer.

2. The projection screen according to claim 1, wherein the projection screen further comprises a transparent substrate, the transparent substrate has a first plane and a second plane opposite to the first plane, and the photochromic layer is formed on the first plane and covers part of the first plane.

3. The projection screen according to claim 2, wherein the projection screen further comprises a transflective layer formed on the second plane.

4. The projection screen according to claim 1, wherein the projection screen further comprises a transflective layer formed on the photochromic layer.

5. The projection screen according to claim 1, wherein the photochromic layer is a film, a sheet or a coating.

6. The projection screen according to claim 1, wherein the photochromic layer comprises a color-changing material, and the color-changing material is selected from the group consisting of silver bromide, silver chloride, silver iodide and organic photochromic molecules.

7. The projection screen according to claim 1, wherein the ambient light contains ultraviolet light, and the ultraviolet light cause the transmittance of the photochromic layer to change.

\* \* \* \* \*